(12) United States Patent
Oguri

(10) Patent No.: US 7,995,248 B2
(45) Date of Patent: Aug. 9, 2011

(54) ASSOCIATING PREVIEW IMAGES WITH DESTINATION ADDRESSES

(75) Inventor: Hirofumi Oguri, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 105 days.

(21) Appl. No.: 11/954,037

(22) Filed: Dec. 11, 2007

(65) Prior Publication Data

US 2008/0137152 A1    Jun. 12, 2008

(30) Foreign Application Priority Data

Dec. 11, 2006  (JP) .................................. 2006-333559

(51) Int. Cl.
*H04N 1/00* (2006.01)
*H04N 1/46* (2006.01)
(52) U.S. Cl. ........................ 358/400; 358/505
(58) Field of Classification Search .................. 358/440, 358/474, 400, 505
See application file for complete search history.

(56) References Cited

U.S. PATENT DOCUMENTS

| 7,301,656 B1* | 11/2007 | Nakagiri et al. ............. 358/1.15 |
| 7,375,860 B2* | 5/2008 | Schlank et al. ............. 358/468 |
| 2005/0097477 A1* | 5/2005 | Camara et al. ............. 715/825 |
| 2005/0188332 A1* | 8/2005 | Kolman ..................... 715/822 |
| 2006/0158706 A1* | 7/2006 | Mori et al. ................ 358/540 |
| 2007/0070442 A1* | 3/2007 | Ohkubo ..................... 358/451 |

FOREIGN PATENT DOCUMENTS

| JP | 2004172874 A | 6/2004 |
| JP | 2006-033406 A | 2/2006 |

OTHER PUBLICATIONS

Machine Translation of JP2004-172874 to Shimatani.*
Japan Patent Office, Notification of Reason for Refusal for Japanese Patent Application No. 2006-333559 (counterpart to above-captioned patent application), dispatched Jan. 25, 2011.

* cited by examiner

*Primary Examiner* — Benny Q Tieu
*Assistant Examiner* — Eric A Rust
(74) *Attorney, Agent, or Firm* — Baker Botts L.L.P.

(57) ABSTRACT

There is disclosed an image processing apparatus including (a) a reading portion which reads an image to obtain image data of the image, (b) a transmission-information display portion which presents, in a single screen, a preview image indicative of a content of the image data obtained by the reading portion, and a plurality of destination addresses, (c) an association setting portion which sets an association between the preview image and one of the destination addresses presented by the transmission-information display portion, which one destination address is selected by a user, and (d) a sending portion which sends the image data the content of which is indicated by the preview image to the destination address with which the preview image is associated, on the basis of the association set by the association setting portion.

17 Claims, 13 Drawing Sheets

FIG.6A

CONFIRMATION SCREEN

PREVIEW — 413

```
[A]    [B²]   [C³]
[D⁴]   [E]    [F¹]
```

DESTINATION — 414

| REGISTERED NAME | FACSIMILE NUMBER |
|---|---|
| XX DAVIS | 052-123-4569 |
| XXX SMITH | 052-123-4512 |
| ERICKSON'S | 052-123-4513 |

FIG.6B

CONFIRMATION SCREEN

PREVIEW — 413

```
[¹][A]       [²²][B²]   [³³][C³]
[⁴⁴][D⁴]  [1][E]       [F¹]
```

DESTINATION — 414

| REGISTERED NAME | FACSIMILE NUMBER |
|---|---|
| XX DAVIS | 052-123-4569 |
| XXX SMITH | 052-123-4512 |
| ERICKSON'S | 052-123-4513 |

FIG.13

SETTING SCREEN

PREVIEW — 413

| F | B | C |
|---|---|---|
| D |   |   |

— 414

| REGISTERED NAME | DESTINATION FACSIMILE NUMBER |
|---|---|
| XX DAVIS | 052-123-4569 |
| XXX SMITH | 052-123-4512 |
| ERICKSON'S | 052-123-4513 |

ASSOCIATING PREVIEW IMAGES WITH DESTINATION ADDRESSES

CROSS REFERENCE TO RELATED APPLICATION

The present application claims priority from Japanese Patent Application No. 2006-333559, which was filed on Dec. 11, 2006, the disclosure of which is herein incorporated by reference in its entity.

BACKGROUND OF THE INVENTION

1. Field of the Invention

The present invention relates to an image processing apparatus, and particularly to an image processing apparatus that can reduce time and effort spent by a user for a transmission of image data, as well as inhibit an erroneous transmission of image data to an unintended destination address.

2. Description of Related Art

There is known a facsimile apparatus having a function of multi-address transmission, which is a function to send data to a plurality of destination addresses easily. The multi-address transmission function enables a user to send data of a document to a plurality of destination addresses although reading of the document for obtaining the data is implemented only once. Hence, the multi-address transmission can save effort and time spent by the user when the user sends a document to a plurality of destination addresses.

On the other hand, there is a case where a document consisting of a plurality of pages is read, and a user desires to send data of the document to a plurality of destination addresses such that data of some of the pages is sent to all the destination addresses but data of the other pages is sent to only a part of the destination addresses. For instance, as is often the case with facsimile transmissions, when the user desires to send a document to a plurality of destination addresses with a facsimile transmittal sheet expressing a name of an addressee and others being attached to the top of the document, the facsimile transmittal sheets are individually prepared and sent to the respective destination addresses with the document, but the document itself is commonly sent to all the destination addresses.

To meet such a demand, there has been proposed an image processing apparatus that can send image data of a document consisting of a plurality of pages, which image data is obtained by reading the document, to a plurality of destination addresses in different manners among the destination addresses such that only one or more pages desired to be sent to each particular one of the destination addresses is/are sent to the particular destination address, as disclosed in JP-A-2004-172874, for instance. More specifically, a user selects one of a plurality of set destination addresses and then selects a page or pages to be sent to the selected destination address, after which the user selects a next one of the destination addresses, and then a page or pages to be sent to the next selected destination address. This step is repeated until the page selection is made for all the destination addresses. Thus, the user can send the document to the destination addresses in different manners among the destination addresses such that only a part of all the pages which is desired to be sent to each particular one of the destination addresses is sent to the particular destination address, although reading of the document is implemented only once. That is, a document can be sent to a plurality of destination addresses with a facsimile transmittal sheet for each of the destination addresses attached.

In the above-described apparatus, the destination address is selected such that first an address selection screen is presented in order that the user can select a destination address therethrough. After the user's selecting the destination address through the address selection screen, the address selection screen is closed or erased and a preview image of the read document is presented, through which the user selects a page or pages to be sent to the currently selected destination address, whereby an association between the destination address and the page or pages is set. According to this arrangement, however, the user can not simultaneously view the preview image and the currently selected destination address when the user associates the destination addresses with the pages to be sent to the respective destination addresses. Hence, during the repetitive, tedious work of setting the associations for all of the destination addresses, the user may associate a page or pages with a destination address that is not intended, resulting in an erroneous data transmission.

SUMMARY OF THE INVENTION

This invention has been developed in view of the above-described situations, and it is an object of the invention, therefore, to provide an image processing apparatus that can reduce time and effort spent by a user for a transmission of image data, as well as inhibit an erroneous transmission of image data.

To attain the above object, the invention provides an image processing apparatus including: (a) a reading portion which reads an image to obtain image data of the image; (b) a transmission-information display portion which presents, in a single screen, a preview image indicative of a content of the image data obtained by the reading portion, and a plurality of destination addresses; (c) an association setting portion which sets an association between the preview image and one of the destination addresses presented by the transmission-information display portion, which one destination address is selected by a user; and (d) a sending portion which sends the image data the content of which is indicated by the preview image to the destination address with which the preview image is associated, on the basis of the association set by the association setting portion.

In the image processing apparatus of the invention, the transmission-information display portion presents in a single screen the preview image indicative of the content of the image data and the destination addresses. The preview image which is presented by the transmission-information display portion is associated with the destination address selected by the user from all the destination addresses presented on the transmission-information display portion, and this association is set by the association setting portion. For instance, the image data indicated by the preview image is associated with address data of the selected destination address, and association data indicative of the set association is stored in the association setting portion. In accordance with the set association, the image data is sent to the associated destination address. Hence, the image data obtained by only once implementing the reading of the image by the reading portion can be sent to the destination addresses individually associated with the image data. Hence, the time and effort spent by the user is reduced. Since the preview image and the destination addresses are presented in a single screen, an error does not tend to occur while the user associates the preview image with a destination address, thereby inhibiting an erroneous transmission of the image data to an unintended destination address.

The above object also can be attained by an image processing apparatus including: (a) a transmission-information display portion which presents, in a single screen, at least one destination address and a plurality of preview images indicative of contents of image data pieces respectively corresponding to a plurality of pages; (b) an association setting portion which sets at least one association between at least one of the preview images presented by the transmission information display portion and at least one of the at least one destination address presented by the transmission information display portion, each set of the at least one preview image and the at least one of the at least one destination address which are to be associated with each other being selected by a user; and (c) a sending portion which sends the image data of the at least one preview image to the at least one of destination address with which the at least one preview image is associated, on the basis of the association which is set by the association setting portion.

In this image processing apparatus, the transmission-information display portion presents in a single screen the preview images indicative of the contents of the image data pieces corresponding to respective pages and at least one destination address. At least one of the preview images presented by the transmission-information display portion and selected by the user is associated with at least one of the at least one destination address presented on the transmission-information display portion, and this association is set by the association setting portion. In accordance with the set association, the image data is sent to the associated destination address. When the at least one destination address presented on the transmission-information display portion is constituted by a plurality of destination addresses, all of them may be associated with the selected preview image or images, or only the destination address or addresses selected by the user may be associated with the selected preview image or images.

Further, the above object can be attained by an image processing apparatus including: (1) a transmission-information display portion which presents, in an arrangement in a single screen, a plurality of preview images indicative of contents of image data pieces respectively corresponding to a plurality of pages; (2) a transmission-information determining portion including at least one of (a) a selecting portion which selects, as image data to be sent, at least one image data piece from the image data pieces of the preview images presented by the transmission-information display portion and (b) a transmission-order determining portion which determines a transmission order which is an order in which at least two of the image data pieces as the image data to be sent are sent; and (3) a sending portion which sends the image data to a receiver in a manner determined by the transmission-information determining portion.

In this image processing apparatus, the transmission-information display portion presents the preview images in the arrangement in the single screen, and the transmission-information determining portion includes at least one of the selecting portion and the transmission-order determining portion. Hence a user can select at least one preview image from the preview images presented by the transmission-information display portion, or can determine the transmission order, while comprehending the preview images in the single screen. Thereby time and effort spent by the user for a transmission of image data can be reduced, and an erroneous transmission of image data can be prevented.

The above-mentioned three image processing apparatuses are especially suitable for a facsimile apparatus or a facsimile function of a multifunction apparatus. In this case, receivers receiving the image data sent by the image processing apparatus according to the present invention are facsimile apparatuses or multifunction apparatuses having facsimile functions respectively. But these image processing apparatuses are also applicable to other kinds of apparatuses, for instance a personal computer connected to Internet. In this case, the receivers are computers.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIGS. 6A and 6B are views of a confirmation screen presented on the LCD of the multifunction apparatus;

FIG. 13 is a view of a confirmation screen presented during implementation of the flowchart of FIG. 12.

DETAILED DESCRIPTION OF PREFERRED EMBODIMENTS

Hereinafter, there will be described presently preferred embodiments of the invention, by referring to the accompanying drawings.

Figure 1:
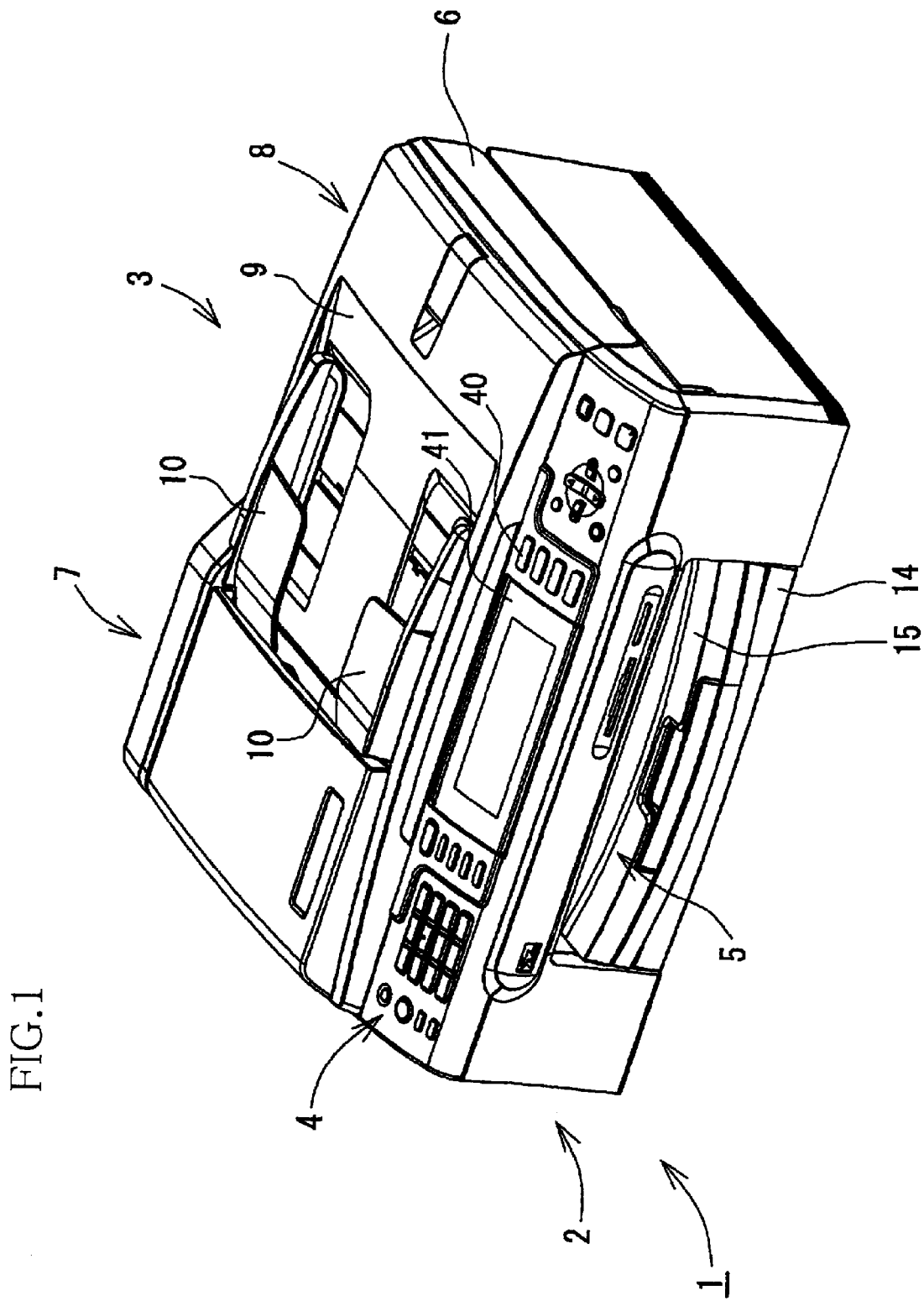
FIG. 1 is an external perspective view of a multifunction apparatus according to one embodiment of the invention.

Referring first to FIGS. 1-9, there will be described a multifunction apparatus 1 according to a first embodiment of the invention. As shown in FIG. 1, the multifunction apparatus 1 is a MFD (Multi Function Device) that integrally includes a printer 2 and a scanner 3 respectively constituting a lower portion and an upper portion of the multifunction apparatus 1, and an operation panel 4 disposed at a front side of the scanner 3. The multifunction apparatus 1 has a plurality of functions such as a copy function, a facsimile function, and a printer function. The printer function is a function to print data received from an external device such as a PC (personal computer), on a recording sheet.

Figure 2:
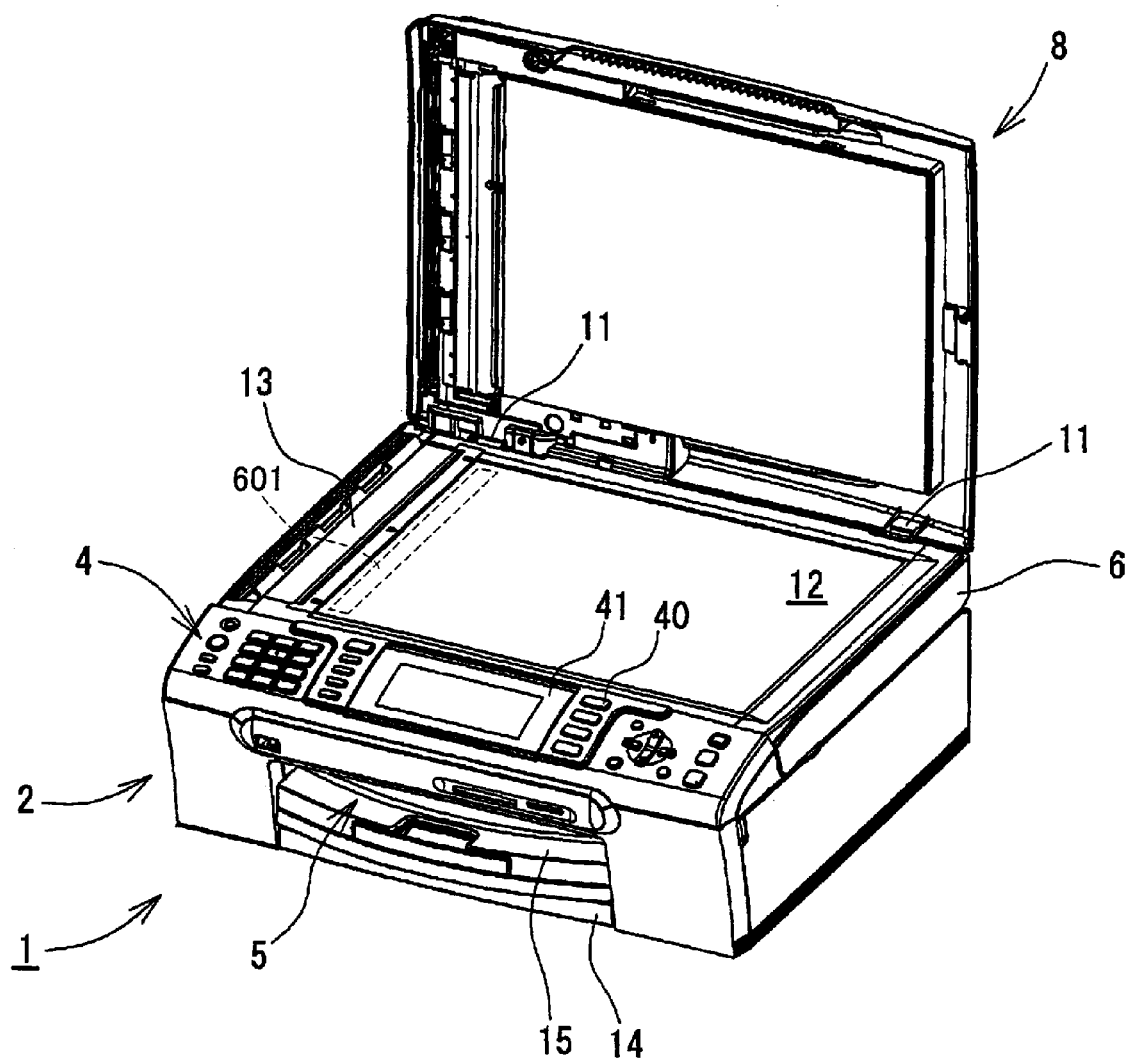
FIG. 2 is an external perspective view of the multifunction apparatus in the state where a document cover is open.

The scanner 3 includes a document reading table 6 and a document cover 8. The document reading table 6 functions as a FBS (Flatbed Scanner). The document cover 8 includes an ADF (auto document feeder) 7 is attached to the document reading table 6 by means of hinges 11 (shown in FIG. 2) on the rear side of the multifunction apparatus 1, such that the document cover 8 is openable/closable relative to the document reading table 6. As shown in FIG. 2, a platen glass 12 is disposed at an upper surface of the document reading table 6, and an image reading unit 601 is disposed inside the document reading table 6.

The platen glass 12 has a rectangular shape that is long in a widthwise direction of the multifunction apparatus 1 and such that a rectangular document sheet can be placed on the platen glass 12 in a landscape direction. The term "landscape direction" herein refers to a direction in which longer sides of the document sheet are parallel to the widthwise direction of the multifunction apparatus 1.

The document reading table 6 is wide open at its upper side, and the platen glass 12 is fitted in this opening. Inside the document reading table 6, there is a space for allowing the image reading unit 601 to move, and for disposing the image reading unit 601, members supporting the image reading unit 601, and a mechanism for driving the image reading unit 601. Hence, the opening of the document reading table 6 at the upper side has dimensions larger than those of the platen glass 12. However, the document reading table 6 is roughly in a similar shape to the platen glass 12 in plan view. That is, the document reading table 6 is a rectangular parallelepiped with a height, which is in plan view long in the widthwise direction, like the platen glass 12.

When a user uses the scanner 3 as a FBS, the user opens the document cover 8, places a document sheet on the platen glass 12, and then closes the document cover 8 to fix the document sheet in place. When an instruction to start reading the document sheet is inputted, the image reading unit 601 is moved along an under surface of the platen glass 12, whereby an image on the document sheet is read by the FBS.

The image reading unit 601 includes a line image sensor that reads the image on the document sheet by reciprocating in a main scanning direction that is a front-rear direction of the multifunction apparatus 1. The image reading unit 601 reads the image by emitting light from a light source toward the document sheet, and directing reflected light from the document sheet by means of a lens to a photoelectric converting transducer which outputs an electrical signal corresponding to an intensity of the reflected light. As the line image sensor, a CIS (Contact Image Sensor), a CCD (Charge Coupled Device) as a miniaturized optical system, or a CMOS (Complementary Metal-Oxide Semiconductor) may be used, for instance. Since the internal structures of the image reading unit 601 and the scanner 3 are not directly relevant to the invention, details description thereof is omitted.

The ADF 7 feeds a document sheet from a document-sheet supply tray 9 to a document-sheet ejection tray 10 along a document feed path. During the feeding of the document sheet by the ADF 7, the document sheet passes over a reading surface 13 on the document reading table 6, during which an image on the document sheet is read by the image reading unit 601 disposed under the reading surface 13. The reading of an image by the ADF 7 is implemented while the document cover 8 is closed relative to the document reading table 6. It is noted that in the invention the ADF 7 is optional, that is, the scanner 3 may not include the ADF 7 but may read an image only by functioning as a FBS. Detailed description of the ADF 7 is omitted.

The printer 2 is an image recording apparatus that records an image on a recording sheet on the basis of image data obtained by the scanner 3 or inputted from an external device. The printer 2 is disposed on the lower side of the scanner 3, as described above. The scanner 3 and the printer 2 are positioned such that rear surfaces of the scanner 3 and the printer 2 are flush with each other, and thus a rear surface of the multifunction apparatus 1 is plane and without unevenness. As an image recording method in which the printer 2 operates, various known methods, e.g., inkjet, electrophotography, and thermal transfer, may be employed.

At a front side of the multifunction apparatus 1 or the printer 2, an opening 5 is formed. In the front opening 5, a recording-sheet supply tray 14 and a recording-sheet ejection tray 15 are disposed such that entireties of the trays 14, 15 are completely accommodated. The recording-sheet supply tray 14 and the recording-sheet ejection tray 15 are vertically arranged, namely, the latter tray 15 is disposed over the former tray 14.

In the printer 2, a U-shaped recording-sheet feed path is disposed. The recording-sheet feed path extends upward from a rear side of the recording-sheet supply tray 14 and then turns frontward to be connected to the recording-sheet ejection tray 15. A recording sheet held in the recording-sheet supply tray 14 is fed out into the recording-sheet feed path with a shorter side of the recording sheet being a leading edge, and then fed and guided along the recording-sheet feed path in a U-turn manner to an image recording position disposed in the recording-sheet feed path. At the image recording position, an image is recorded on the recording sheet by the printer 2. The recording sheet on which the image has been recorded is ejected onto the recording-sheet ejection tray 15.

At a front side of the multifunction apparatus 1, the operation panel 4 is disposed. The operation panel 4 has a rectangular shape long in the widthwise direction of the apparatus 1, as shown in FIGS. 1 and 2. Through the operation panel 4, the user can input instructions to operate the printer 2 and the scanner 3. The operation panel 4 has various kinds of manual operation keys 40 and a LCD (Liquid Crystal Display) 41. When a predetermined instruction is inputted to the multifunction apparatus 1, an operation of the multifunction apparatus 1 is controlled by a control unit 20 (shown in FIG. 3) on the basis of the information or instruction inputted.

The multifunction apparatus 1 operates on the basis of an instruction transmitted from a PC or others that is connected to the multifunction apparatus 1, via a printer driver, a scanner driver, or others, as well as on the basis of an instruction inputted through the operation panel 4.

As shown in FIGS. 1 and 2, a dimension of the LCD 41 in the front-rear direction of the multifunction apparatus 1 is made as large as possible such that the LCD 41 can be disposed in the operation panel 4. A dimension of the LCD 41 in the widthwise direction of the multifunction apparatus 1 is 4/3 times the dimension thereof in the front-rear direction or longer. In other words, a ratio of the dimension of the LCD 41 in the widthwise direction to the dimension of the LCD 41 in the front-rear direction is larger than 4/3. In this specific example, the ratio of the dimension of the LCD 41 in the widthwise direction to the dimension of the LCD 41 in the front-rear direction is 8/3. The LCD 41 is capable of full-color display. When a facsimile transmission is made, a destination input screen (shown in FIG. 4), a setting screen (shown in FIG. 5), and a confirmation screen (shown in FIG. 6) are presented on the LCD 41. These screens will be described later with reference to the drawings.

Figure 3:
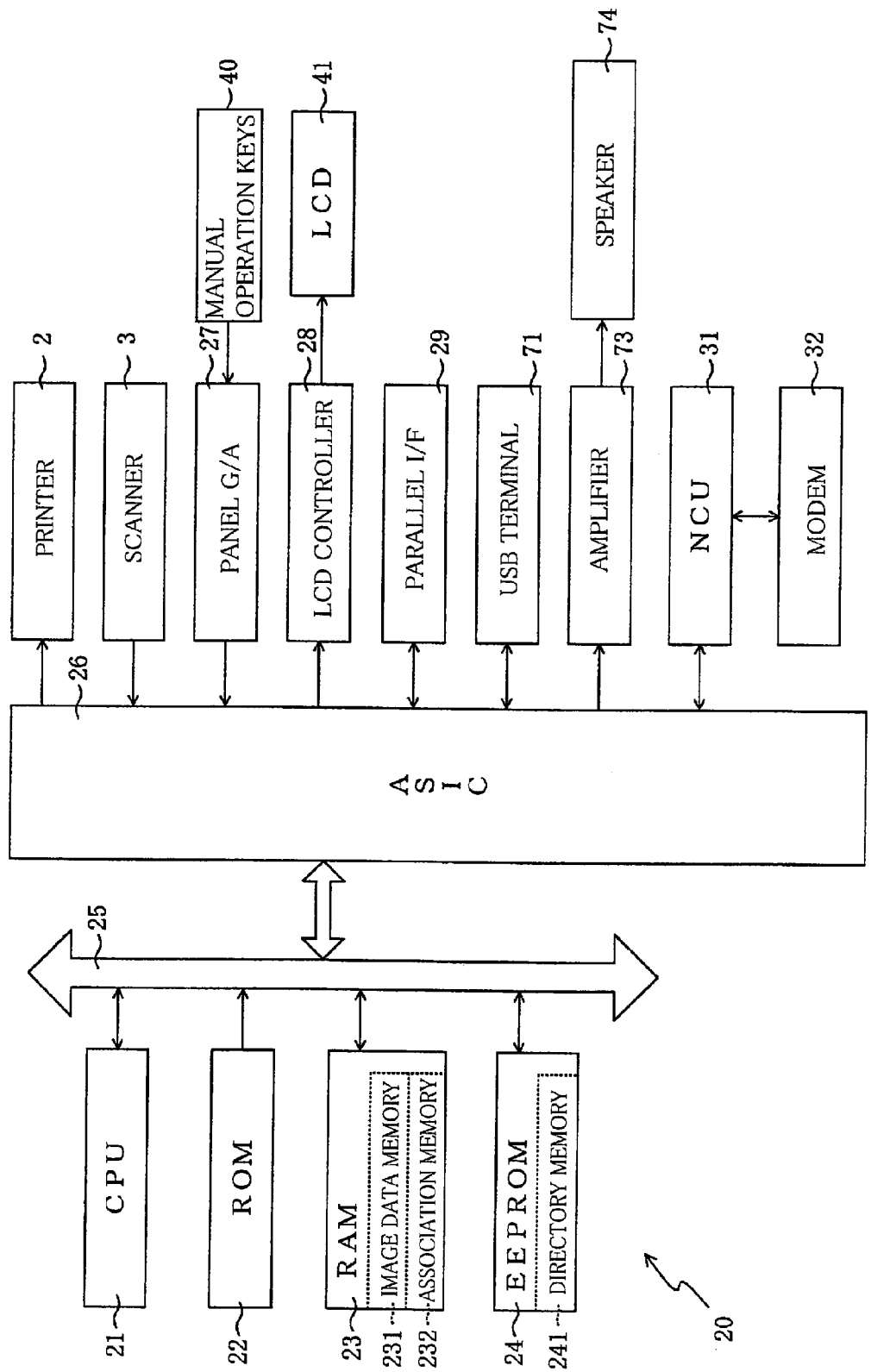
FIG. 3 is a block diagram of a control unit of the multifunction apparatus.

Referring to FIG. 3, there will be described a general structure of the control unit 20 that controls operations of the multifunction apparatus 1. FIG. 3 is a block diagram of the control unit 20. The control unit 20 generally controls operations of the multifunction apparatus 1 including those of the printer 2, the scanner 3, and the operation panel 4. As shown in FIG. 3, the control unit 20 is constituted by a microcomputer mainly including a CPU (Central Processing Unit) 21, a ROM (Read Only Memory) 22, a RAM (Random Access Memory) 23, and an EEPROM (Electrically Erasable and Programmable ROM) 24. The control unit 20 is connected via a bus 25 to an ASIC (Application Specific Integrated Circuit) 26.

Figure 7:
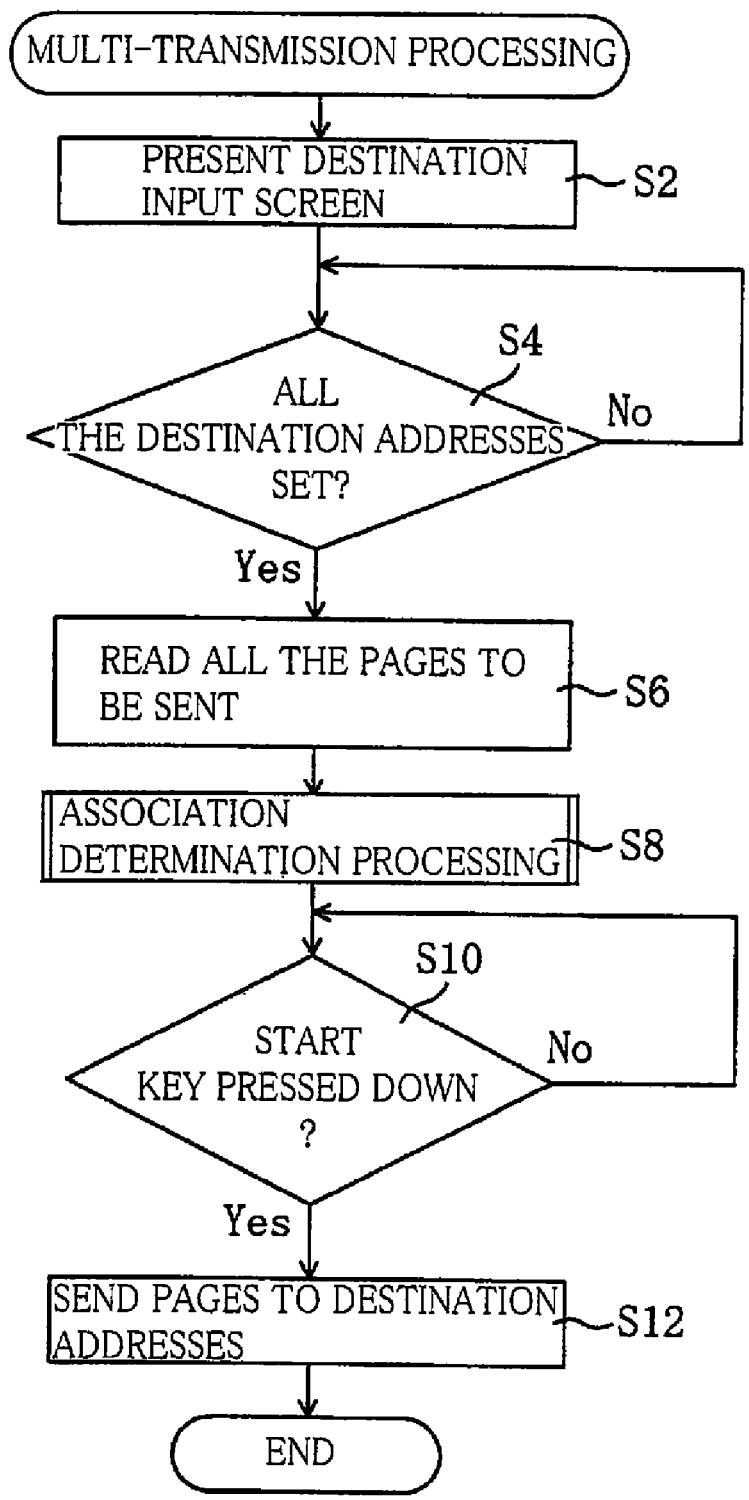
FIG. 7 shows a flowchart according to which a multi-transmission processing is implemented in the multifunction apparatus.
Figure 8:
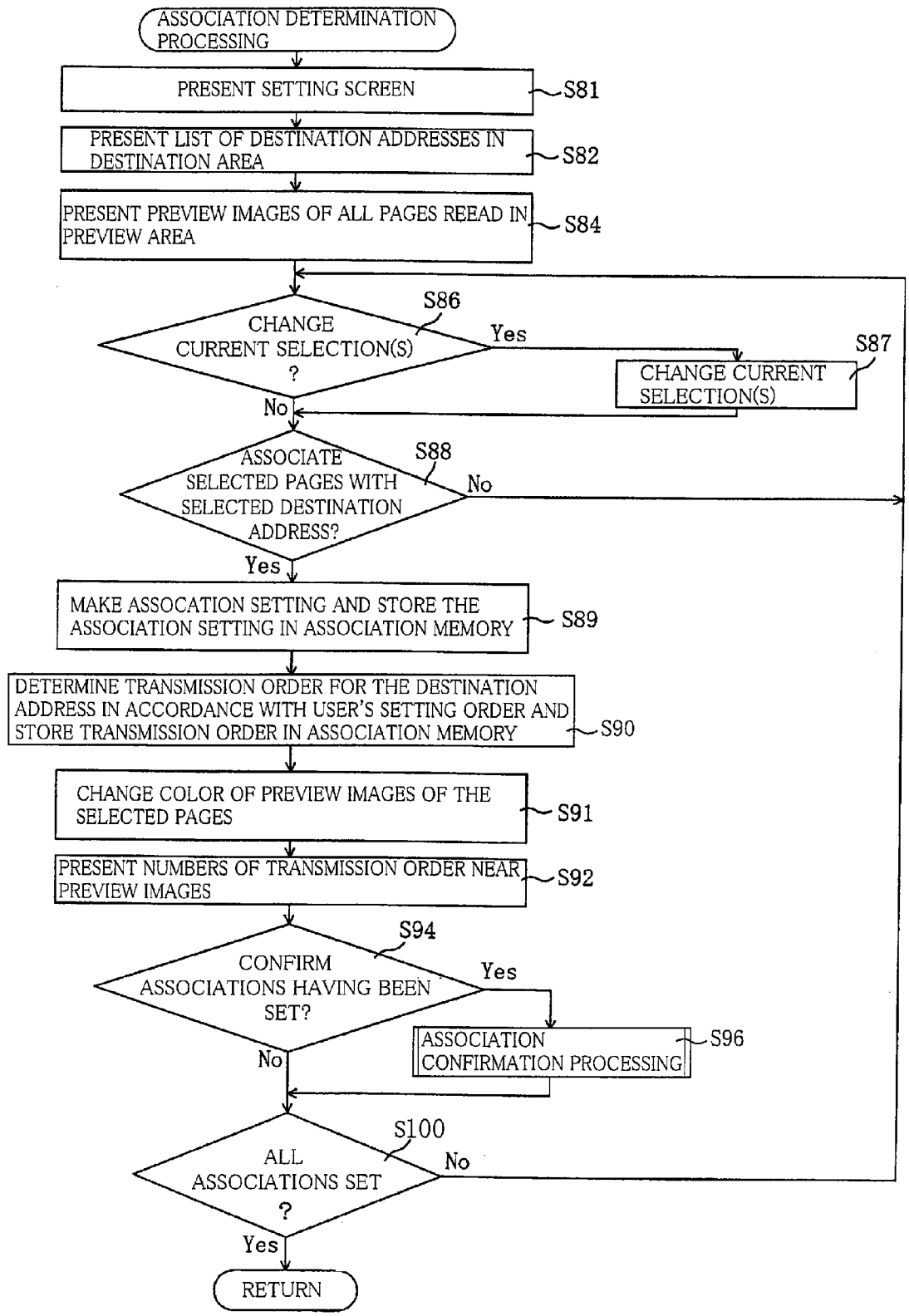
FIG. 8 shows a flowchart according to which an association determination processing is implemented in the multifunction apparatus.
Figure 9:
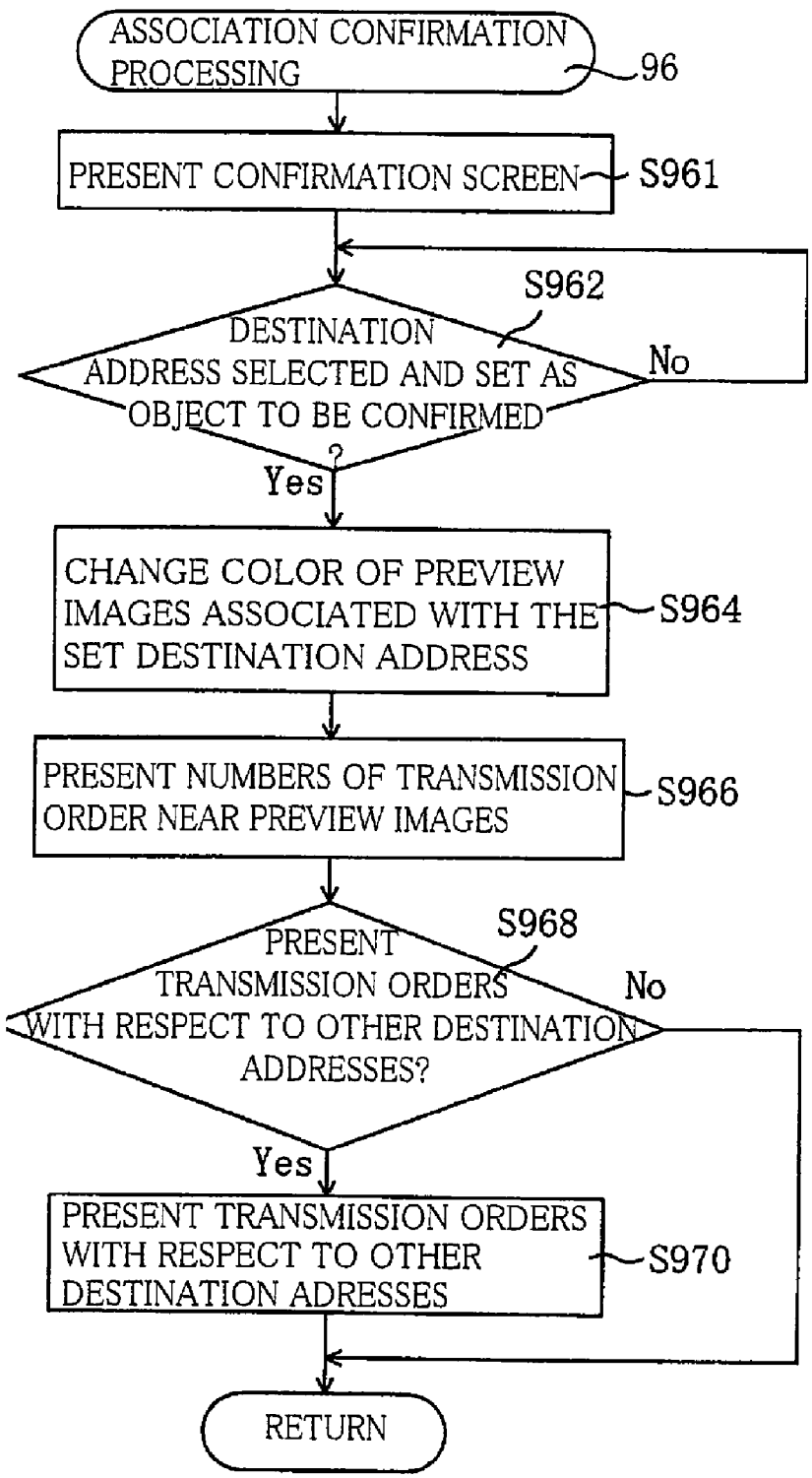
FIG. 9 shows a flowchart according to which an association confirmation processing is implemented in the multifunction apparatus.

The CPU 21 is a central processor that generally controls the multifunction apparatus 1, and executes various programs including one according to which a processing illustrated in the form of a flowchart in FIGS. 7-9 is implemented. The ROM 22 stores programs for controlling various kinds of operations of the multifunction apparatus 1, and others.

The RAM 23 is used as a storage area or a work area for temporarily storing various kinds of data when the CPU 21 executes the program. The RAM 23 includes an image data memory 231 and an association memory 232.

The image data memory 231 stores image data obtained by the scanner 3. The image data is constituted by image data of each of at least one page, and data of one page is handled as a unit. Image data of a page may be referred to simply as "page" hereinafter.

The association memory 232 stores an association data of an association between a destination address and an image of a page to be sent to the destination address. This association between the destination address and the image of the page is set by the user, as will be described later with reference to FIG. 5. The association data may be referred to simply as "association" hereinafter.

In the multifunction apparatus 1 of this embodiment, a facsimile transmission is made on the basis of the association stored in the association memory 232. For instance, when among all the pages read by the scanner, first and third pages are associated with a destination address of an addressee named "xxx Davis", and second and third pages are associated with a destination address of an addressee named "xxx Smith", these associations respectively related to "xxx Davis" and "xxx Smith" are stored in the association memory 232, only the first and third pages are sent to "xxx Davis" and only the second and third pages are sent to "xxx Smith". In this way, the user can associate a desired one or more pages among all of the pages read by the scanner 3 with each particular one of a plurality of destination addresses, in order that only the desired page or pages is/are sent to the destination address associated therewith. Hence, even when a plurality of pages are read and sent by facsimile to a plurality of destination addresses in different manners among the destination addresses such that only a part of all the pages which is desired to be sent to each particular destination address is sent to the particular destination address, reading of the pages by the scanner 3 is implemented only once, thereby reducing the time and effort spent by the user for making such a facsimile transmission.

The association memory 232 also stores an order data of an order in which a plurality of pages are sent to a destination address. The order of sending of the pages will be later described with reference to FIG. 5. The order data may be referred to simply as "order" hereinafter.

The EEPROM 24 includes a directory memory 241. The directory memory 241 stores data of names of addressees and their facsimile numbers that are registered by the user. It is noted that the names of addressees and the facsimile numbers correspond to "information on destination addresses" according to the invention. The data of the information on destination addresses may be referred to simply as "information on destination addresses" hereinafter. The ASIC 26 controls operations of the printer 2, the scanner 3, and the operation panel 4, in response to instructions from the CPU 21.

To the ASIC 26, a panel gate array 27 is connected. The panel gate array 27 controls the manual operation keys 40 through which a desired instruction is inputted to the multifunction apparatus 1. The panel gate array 27 detects each of the manual operation keys 40 pressed down, and outputs to the CPU 21 a predetermined signal that corresponds to a key code assigned to the manual operation key 40 pressed down. That is, key codes are assigned to the respective manual operation keys 40. Upon receiving a signal from the panel gate array 27, the CPU 21 implements a control processing in accordance with a key processing table defining correspondences between the key codes and processing controls that should be implemented when the respective keys 40 are pressed down. The key processing table may be stored in the ROM 22, for instance.

To the ASIC 26, a LCD controller 28 is connected. The LCD controller controls presentation of screens on the LCD 41. The LCD controller 28 presents on the LCD 41 information related to an operation of the printer 2 or the scanner 3, on the basis of an instruction from the CPU 21. The screens presented on the LCD 41 will be described later with reference to FIGS. 4-6.

Further, an amplifier 73 is connected to the ASIC 26. A speaker 74 is connected to the amplifier 73, and the amplifier 73 makes the speaker 74 sound to output a ring sound, a denial sound, a message, and others.

To the ASIC 26 are further connected a parallel interface 29 and a USB terminal 71 to which a parallel cable and a USB cable are connectable, respectively, in order that the multifunction apparatus 1 is capable of data communicate with a computer via each of the cables. To the USB terminal 71, an external device such as a digital camera and a personal computer is connectable via a USB cable. To the ASIC 26 are also connected a NCU (Network Control Unit) 31 and a modem 32 for enabling the facsimile function. The multifunction apparatus 1 may include a network interface (not shown) that enables data transmission with a computer connected to a network.

Figure 4:
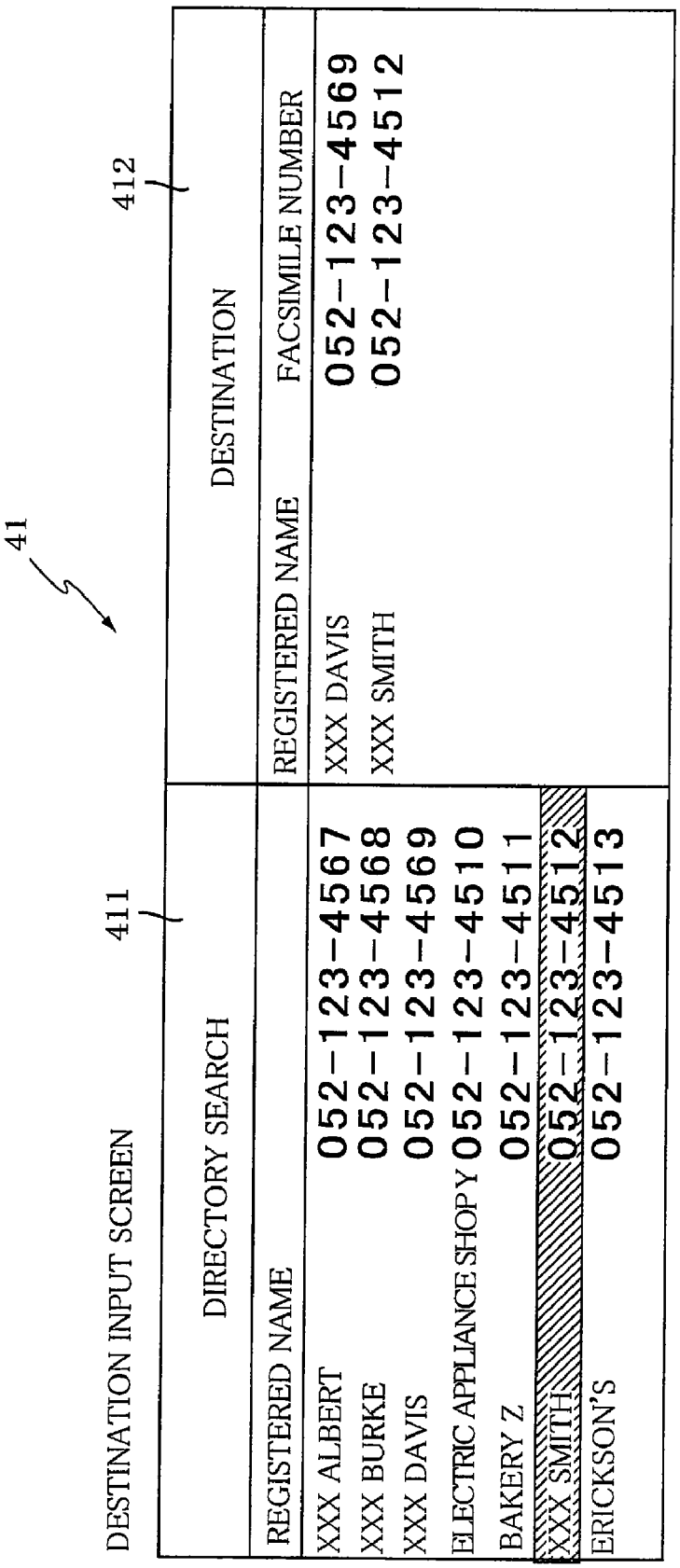
FIG. 4 is a view of a destination input screen presented on a LCD of the multifunction apparatus.

Referring now to FIGS. 4-6, there will be described the screens presented on the LCD 41 when a facsimile transmission is made. FIG. 4 shows one example of a destination input screen presented on the LCD 41. The destination input screen is halved in its longitudinal direction, that is, two halves of the destination input screen provides two sub screens that are respectively constituted by a directory search area 411 and a first destination area 412.

In the directory search area 411, the addressees and their facsimile numbers that are stored in the directory memory 241 (shown in FIG. 3) are presented. In a case where all of the information stored in the directory memory 241 can not be presented at once in the directory search area 411 due to a limited space, only a part of the information is presented on the sub screen of the directory search area 411, and the user can scroll the sub screen by inputting an instruction to do so through the manual operation keys 40 (shown in FIG. 1) in order to present the rest of the information stored in the directory memory 241.

The user selects at least one addressee, i.e., destination address, from the presentation on the directory search area 411 and sets the destination address as a destination to which image data is to be sent. In the first destination area 412, the name of the addressee selected and set as the destination address and the facsimile number thereof are presented. At this time, information on destination addresses registered in advance, and each destination address selected from the information on destination addresses and set by the user are presented in a same screen, namely, the destination input screen. Hence, the user can easily view to check the destination address having been set and the destination address or addresses not having been set, thereby reducing errors in setting destination addresses.

When all the desired destination addresses are selected and set, the LCD 41 presents a setting screen thereon. FIG. 5 shows one example of the setting screen presented on the LCD 41. The setting screen is halved in its longitudinal direction into two sub screens that are respectively constituted by a preview area 413 and a second destination area 414.

In the preview area 413, preview images indicative of contents of the image data of the respective pages obtained by the scanner 3 are presented in an arrangement. That is, a preview image is provided for each page. The user can select and set, in units of pages, some of the preview images presented in the preview area 413. Each preview image is presented in a framed rectangle, and a preview image currently selected by the user is framed with a bolder line than a preview image not selected, as shown in FIG. 5A, in order to differentiate therebetween.

In the second destination area 414, the name of the addressee selected and set as the destination address and the facsimile number thereof are presented. At this time, among all the destination addresses presented in the second destination area 414, only the destination address currently selected by the user is highlighted by use of another color than a color used for the other destination addresses not selected. In the second destination area 414 of the setting screen shown in FIGS. 5A and 5B, a destination address currently selected is indicated by being differentiated in color, namely, a background of the addressee name and the facsimile number of the selected destination address is gray, and a background of the addressee names and facsimile numbers of the other destination addresses that are not selected is white.

Figure 5A:
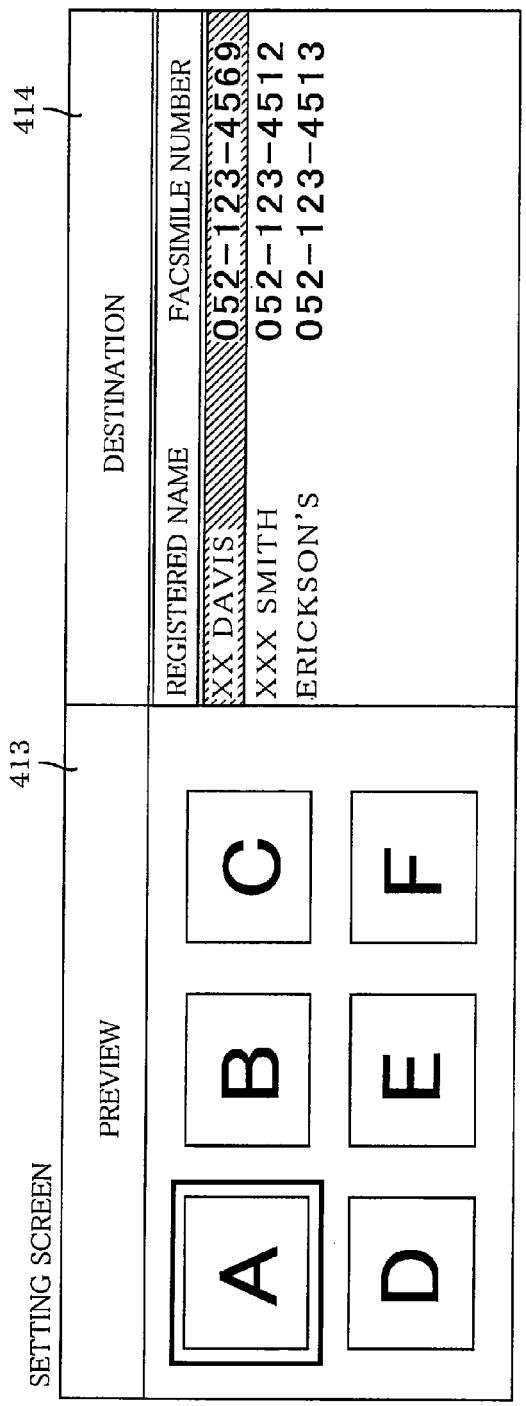
FIGS. 5A and 5B are views of a setting screen presented on the LCD of the multifunction apparatus.

As shown in FIG. 5A, when the user manipulates the operation panel 4 to make a predetermined setting while one destination address and one preview image are selected through the setting screen, the page currently selected is associated with the destination address currently selected. The thus produced association is stored in the association memory 232 (shown in FIG. 3). For instance, as shown in FIG. 5A, when the user makes the predetermined setting while a preview image of a page A and the destination address of "xxx Davis" are selected, the page A is associated with the destination address "xxx Davis", and this association is stored in the association memory 232. When the image data is sent, the associations between the pages and the destination addresses that are stored in the association memory 232 are referred to, and only the page or pages associated with each particular destination address is/are sent to the particular destination address. Hence, in this specific case, the page A is sent to the addressee "xxx Davis". Since the associations between the preview images set by the user in units of pages and the destination addresses set by the user are stored, the user can send each destination address a page or pages that is/are associated with the destination address, thereby reducing the time and effort spent by the user for sending a plurality of pages to a plurality of destination addresses such that only a part of all the pages which is desired to be sent to each particular destination address is sent to the particular destination address. Further, since the user sets the preview images in units of pages, an error does not tend to occur during the manipulation to produce the associations between the image data of the pages and the destination addresses, thereby inhibiting an erroneous data transmission to an unintended address.

Figure 5B:
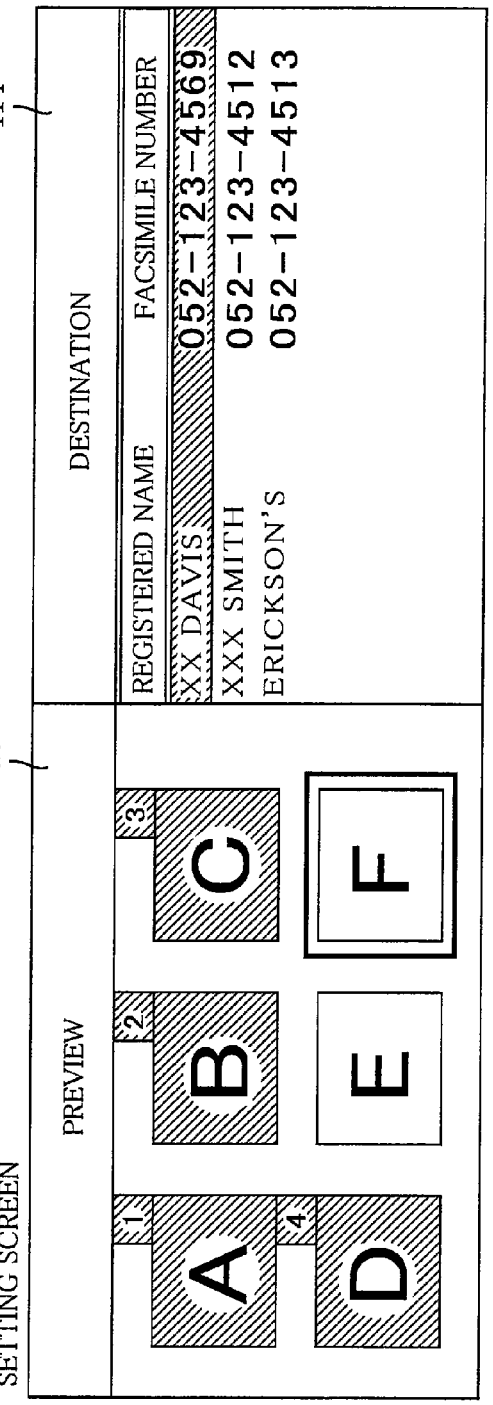

The preview image of the page A having been associated to the currently selected destination address as described above is presented in the setting screen in a different color from the other preview images not selected in order to be differentiated from the preview images not selected. FIG. 5B shows a case where preview images of pages A, B, C and D are selected, and the selected preview images are indicated by being differentiated in color, namely, the preview images of the pages A-D are grayed and the other preview images not selected are not grayed. Hence, by viewing the setting screen, the user can see or comprehend that image data of the pages A, B, C and D is to be sent to the addressee "xxx Davis".

As shown in FIG. 5B, the preview images indicative of the contents of the image data obtained by the scanner 3 and the destination addresses are presented in a single screen on the LCD 41. Hence, the user can make a setting while viewing the preview images and the destination addresses at a time. Therefore, an error does not tend to occur in producing or setting an association between each destination address and a page or pages to be sent to the destination address, thereby inhibiting an erroneous data transmission to an unintended address. Further, the user can easily distinguish the selected destination address and preview image(s) from the other destination addresses and preview images that are not selected, since the selected destination address and preview image(s) are presented differently from those not selected. Hence, an error does not tend to occur in producing or setting an association between each destination address and a page or pages to be sent to the destination address.

When a plurality of pages are sent to a destination address, the pages are sent in an order in which the associations of the pages with the destination address were set. Although there has been described above that one or more desired or selected pages is/are associated with each destination address and sent to the destination address, it is assumed hereinafter that in this specific case at least two pages are sent to each of the destination addresses and thus a transmission order is determined for each of the destination addresses. For instance, where the pages A, B, C and D are sequentially associated with the destination address "xxx Davis" in the order of description, the pages A, B, C, D are sent in the same order to "xxx Davis". This order of sending (hereinafter referred to as "transmission order") is presented in the preview area 413 in units of pages and at positions near the preview images. For instance, in the case of FIG. 5B, numbers 1-4 of the transmission order are presented near the respective preview images of the pages A-D, respectively. Since the numbers of the determined transmission order are thus presented near the preview images, the user can easily see or comprehend the determined transmission order.

As described above, the transmission order in which pages are sent to a destination address is determined in accordance with the order in which the user sets the association between the pages and the destination addresses through the setting screen. Hence, the user can set a transmission order as desired by setting the association between the pages and the destination address in the same order. Therefore, it is made unnecessary to take account of an order in which the user sets or places document sheets to be read and sent by facsimile, thereby reducing the time and effort spent by the user for sending a plurality of pages to a plurality of destination addresses such that only a part of all the pages which is desired to be sent to each particular destination address is sent to the particular destination address. The thus determined transmission order in which pages are sent is associated with the corresponding destination address and stored in the association memory 232 (shown in FIG. 3).

FIG. 6 shows one example of a confirmation screen presented on the LCD 41. The confirmation screen is halved in its longitudinal direction to provide two sub screens that are respectively constituted by the preview area 413 and the second destination area 414. In the same way as the setting screen described above with reference to FIG. 5, the preview images of all the pages read by the scanner 3 are presented in the preview area 413. In the second destination area 414, the destination addresses are presented such that a destination address currently selected is indicated by being differentiated in color than the other addresses.

On the confirmation screen, and in the preview area 413, the preview images associated with the destination address currently selected on the second destination area 414 are presented in a color different from the preview images not selected, and the numbers of the transmission order are presented near the preview images. When the user desires to see the pages to be sent to a particular destination address and the transmission order in which the pages are to be sent to the destination address, the user selects the destination address on the confirmation screen, whereby the pages and the transmission order associated with the destination address are presented.

For instance, as shown in FIG. 6A, when a destination address "Erickson's" is selected, pages B, C, D and F to be sent thereto are presented in a color different from the other pages that are not to be sent thereto, and a transmission order in which the pages B, C, D and F are to be sent to "Erickson's" is also presented.

Thus, a destination address, preview images of pages associated to the destination address, and a transmission order in which the pages are to be sent to the destination address are presented in a single screen, namely, the confirmation screen. Hence, the user can easily view the contents of the settings.

FIG. 6B shows a case where transmission orders are presented for all the intended destination addresses on the confirmation screen at a time. In this case, numbers of a transmission order of a destination address are presented in a same color, that is, the transmission orders of the destination addresses are differentiated from one another by use of respective colors. More specifically, a color of a background of a destination address presented in the second destination area 414 is used in the preview area 413 to indicate the transmission order of the destination address. It is noted that since FIG. 6 is monochrome, three colors in the confirmation screen are represented in the form of a white part, a gray part, and a mesh pattern in FIG. 6.

For instance, as shown in FIG. 6B, when the background of the destination address "Erickson's" is gray in the second destination area 414, numbers 1-4 background of which are gray in the preview area 413 indicate a transmission order in which the pages B, C, D and F are to be sent to "Erickson's". By this arrangement, even when pages to be sent and transmission orders are individually set for the respective destination addresses, the user can easily view and check or confirm the pages and the transmission orders of the destination addresses. That is, even though the transmission orders of the destination addresses are presented at once, the user can distinguish among the transmission orders since the numbers of the determined transmission orders are presented by being differentiated from one another by use of different colors for the respective destination addresses. This mode of presentation is particularly effective in the confirmation screen, but may be employed in the setting screen also.

Referring next to a flowchart of FIGS. 7-9, there will be described processings implemented by the multifunction apparatus 1.

FIG. 7 is a flowchart illustrating a multi-transmission processing. The multi-transmission processing is initiated when an instruction to send image data to a plurality of destination addresses is inputted by the user.

The processing flow begins with step S2 in which the destination input screen (shown in FIG. 4) is presented on the LCD 41. The user sets destination addresses on the destination input screen. As described above with reference to FIG. 4, when the user selects and sets a destination address through the destination input screen, the destination address having been set is presented in the first destination area 412 of the destination input screen.

Then, the processing flow goes to step S4 in which it is determined whether setting of all the desired destination addresses is complete. This determination on the completion of the setting of the desired destination addresses is made by determining whether the user manipulates the manual operation keys 40 in a predetermined manner while the destination addresses having been set are presented in the first destination area 412. When a negative decision (NO) is made in step S4, that is, when it is determined in step S4 that setting of the desired destination addresses is not yet complete, the processing flow repeats the same step S4, until an affirmative decision (YES) is made. When it is determined in step S4 that all the desired destination addresses have been set, that is, when an affirmative decision (YES) is made in step S4, the processing flow goes to step S6 in which the document sheets held in the document-sheet supply tray 9 (shown in FIG. 1) of the ADF 7 are read by the scanner 3 to obtain image data of all the document sheets that correspond to the pages to be sent. The image data of the pages is stored in the image data memory 231 (shown in FIG. 3).

The processing flow then goes to step S8 in which an association determination processing is implemented. In the association determination processing, the associations between the pages and the destination addresses are produced, and the transmission orders are determined for the respective destination addresses. This association determination processing will be described later with reference to FIG. 8. Thereafter, the processing flow goes to step S10 in which it is determined whether the user presses down a start key (not shown) included in the manual operation keys 40. When a negative decision (NO) is made in step S10, that is, when it is determined in step S10 that the user does not press down the start key, the processing flow repeats the same step S10, until an affirmative decision (YES) is made. On the other hand, when the user presses down the start key and an affirmative decision (YES) is made in step S10, the processing flow goes to step S12 in which the image data is sent to the destination addresses. The transmission of the image data is implemented in accordance with the associations between the pages and the destination addresses and the transmission orders as determined in the association determination processing of step S8.

According to the multi-transmission processing, reading of the pages by the scanner 3 is implemented only once, but the thus obtained image data of the pages can be sent to a plurality of destination addresses in different manners among the destination addresses such that only a part of all the pages which is desired to be sent to each particular destination address is sent to the particular destination address, thereby reducing the time and effort spent by the user for making such a facsimile transmission. Since the transmission orders in which pages are sent to the respective destination addresses are determined in the association determination processing of step S8, an order to read by the scanner 3 the document sheets corresponding to the pages of the image data is arbitrary, that is, upon the reading of the document sheets, the user needs not to arrange the document sheets in an order taking account of the transmission order. In this regard, too, the time and effort spent by the user can be reduced.

FIG. 8 is a flowchart illustrating the association determination processing of step S8. The association determination processing begins with step S81 in which the setting screen (shown in FIG. 5) is presented on the LCD 41. The processing flow then goes to step S82 in which a list of the destination addresses set by the user is presented in the second destination area 414 of the setting screen, then to step S84 in which preview images of all the pages read by the scanner 3 are presented in the preview area 413. According to this arrangement, the user can view the list of the destination addresses and the preview images of all the pages at once.

The processing flow then goes to step S86 in which it is determined whether an instruction to change a current selection (i.e., one or more currently selected preview images) among the preview images presented in the setting screen or a current selection (i.e., a currently selected destination address) among the destination addresses presented in the setting screen is inputted. As described above with reference to FIGS. 5A and 5B, in the preview area 413 of the setting screen, preview images of the respective pages are presented, and the preview image of each selected page is presented as the current selection, that is, in a manner differentiated from the other preview images that are not selected, and one of all the destination addresses presented is presented as the current selection, that is, presented in a manner differentiated from the other destination addresses that are not selected. The user can change, as desired, the current selection(s) among the preview images and/or among the destination addresses through manipulation of the manual operation keys 40.

When an affirmative decision (YES) is made in step S86, that is, when it is determined in step S86 that an instruction to change the current selection(s) among the preview images and/or among the destination addresses is inputted, the processing flow goes to step S87 to change the selection(s) among the preview images and/or among the destination addresses in accordance with the manipulation by the user, and then goes to step S88. On the other hand, when a negative decision (NO) is made in step S86, that is, when it is determined in step S86 that an instruction to change the current selection(s) among the preview images and/or among the destination addresses is not inputted, the processing flow skips step S87 and goes to step S88.

In step S88, the user is prompted to select whether or not to make a setting to associate the currently selected pages with the currently selected destination address. When a negative decision (NO) is made in step S88, that is, when the user does not select in step S88 to make a setting to associate the currently selected pages with the currently selected destination address, the processing flow goes back to step S86 to repeat steps S86-S88. When an affirmative decision (YES) is made in step S88, that is, when the user selects in step S88 to make a setting to associate the currently selected pages with the currently selected destination address, the processing flow goes to step S89 in which the setting to associate the currently selected pages with the currently selected destination address is made, and this setting of the association is stored in the association memory 232 (shown in FIG. 3). Then, the processing flow goes to step S90 in which a transmission order of the destination address is determined to accord with the order in which the settings to associate the respective selected pages to the currently selected destination address are made, and the thus determined transmission order is stored in the association memory 232.

In the next step S91, a color in which a preview image of each of the pages associated with the destination address in step S89 is presented is changed. In the following step S92, numbers of the transmission order determined in step S90 are presented near the respective preview image or images the color of which has been changed.

Then, the processing flow goes to step S94 in which it is determined whether the user selects to confirm the associations having been set. When a negative decision (NO) is made in step S94, that is, when the user does not select to confirm the associations having been set in step S94, the processing flow skips step S96 and goes to step S100. On the other hand, when an affirmative decision (YES) is made in step S94, that is, when the user selects to confirm the associations having been set in step S94, the processing flow goes to step S96 to implement an association confirmation processing in which the associations having been set are presented on the LCD 41. The association confirmation processing will be described later with reference to FIG. 9.

In step S100, it is determined whether all the associations have been set. When the user inputs an instruction to terminate the settings of the associations by manipulation of the manual operation keys 40 in a predetermined manner, an affirmative decision (YES) is made in step S100, and the association determination processing of this cycle is terminated. On the other hand, when the user does not input an instruction to terminate the settings of the associations, a negative decision (NO) is obtained in step S100, and the processing flow goes back to step S86 to repeat step S86 and the following steps.

According to the association determination processing, the user can set the association between each destination address and the pages to be sent thereto, and determine the transmission order in which the pages are to be sent to the associated destination address on the basis of the order in which the association setting was made.

FIG. 9 is a flowchart illustrating the association confirmation processing of step S96. The association confirmation processing begins with step S961 in which the confirmation screen (shown in FIG. 6) is presented on the LCD 41. The processing flow then goes to step S962 in which it is determined whether a destination address is selected, as an object to be confirmed, from the destination addresses presented in the second destination area 414 of the confirmation screen, and set. When it is determined in step S962 that a destination address is not selected, that is, when a negative decision (NO) is made in step S962, the processing flow repeats the same step S962, until an affirmative decision (YES) is made.

When it is determined in step S962 that a destination address is selected and an affirmative decision (YES) is made, the processing flow goes to step S964 in which a color in which the preview images of the pages having been associated with the set destination address is changed, and then goes to step S966 in which the numbers of the transmission order are presented near the preview images.

In the following step S968, the user is prompted to select whether or not to present the transmission orders of the other destination addresses. When the user selects to present the transmission orders with respect to the other destination addresses, an affirmative decision (YES) is made in step S968, the processing flow goes to step S970 in which the transmission orders of the other destination addresses are presented for a predetermined time period, that is, as described above with respect to FIG. 6B, the transmission orders of all the destination addresses are presented. In this case, in order to enable the user to distinguish among the transmission orders of the respective destination addresses, the numbers of the transmission orders are differentiated in color from address to address. With this presentation of the transmission orders of the other destination addresses, the association confirmation processing of this cycle is terminated.

When the user does not select to present the transmission orders of the other destination addresses in step S968, that is, when a negative decision (NO) is obtained in step S968, the processing flow skips step S970 and the association confirmation processing of this cycle is terminated. According to the association confirmation processing, a plurality of destination addresses, the pages to be sent to the destination addresses, and the transmission orders are presented in a single screen such that the transmission orders of the respective destination address are distinguishable from one another by use of different colors. Hence, even though the pages are to be sent to a plurality of destination addresses, the user can easily see or comprehend the associations between the pages and the destination addresses, and accordingly the contents of the settings.

The user can check or confirm, in the association confirmation processing of step S96, the associations having been set, during the association determination processing of step S8 in which the associations between the destination addresses and the pages are determined. That is, the user can set a further association while viewing the association(s) already set, whereby the settings of the associations are facilitated.

There will be described several other embodiments of the invention each of which differs from the first embodiment only in a part, with reference to FIGS. 10-13. In the following description of the other embodiments, only the different parts will be described. The parts or elements corresponding to those in the first embodiment will be denoted by the same reference numerals or symbols and description thereof is omitted.

There will be described a second embodiment of the invention, which differs from the first embodiment only in the association determination processing of step S8 in the flowchart of FIG. 8. That is, in the association determination processing of step S8 in the first embodiment, the preview images of all the pages are presented at a time in the preview area 413 of the setting screen. However, in the association determination processing of step S80 in the second embodiment, preview images of a predetermined number of pages, e.g., six pages, are presented at a time in an arrangement in the preview area, and the user scrolls the screen so as to view other preview images.

There will be described a flowchart of FIG. 10 which illustrates the association determination processing of step S80 in the second embodiment. The association determination processing of step S80 differs from that of step S8 in the first embodiment shown in FIG. 8, only in that steps S871 and S872 are provided. Hence, only these steps will be described.

In the association determination processing of step S80, after a determination is made in step S86 on whether an instruction to change a current selection among preview images presented in a setting screen presented on a LCD 41 or a current selection among destination addresses presented in the setting screen is inputted, it is determined in step S871 whether an instruction to scroll a screen of a preview area 413 is inputted. When it is determined in step S871 that an instruction to scroll the screen of the preview area 413 is inputted, that is, when an affirmative decision (YES) is made in step S871, the processing flow goes to step S872 in which the screen of the preview area 413 is scrolled and preview images other than the initially presented preview images are presented, and then goes to step S88.

On the other hand, when a negative decision is made in step S871, that is, when it is determined in step S871 that an instruction to scroll the screen of the preview area 413 is not inputted, the processing flow skips step S872 and goes to step S88.

Figure 10:
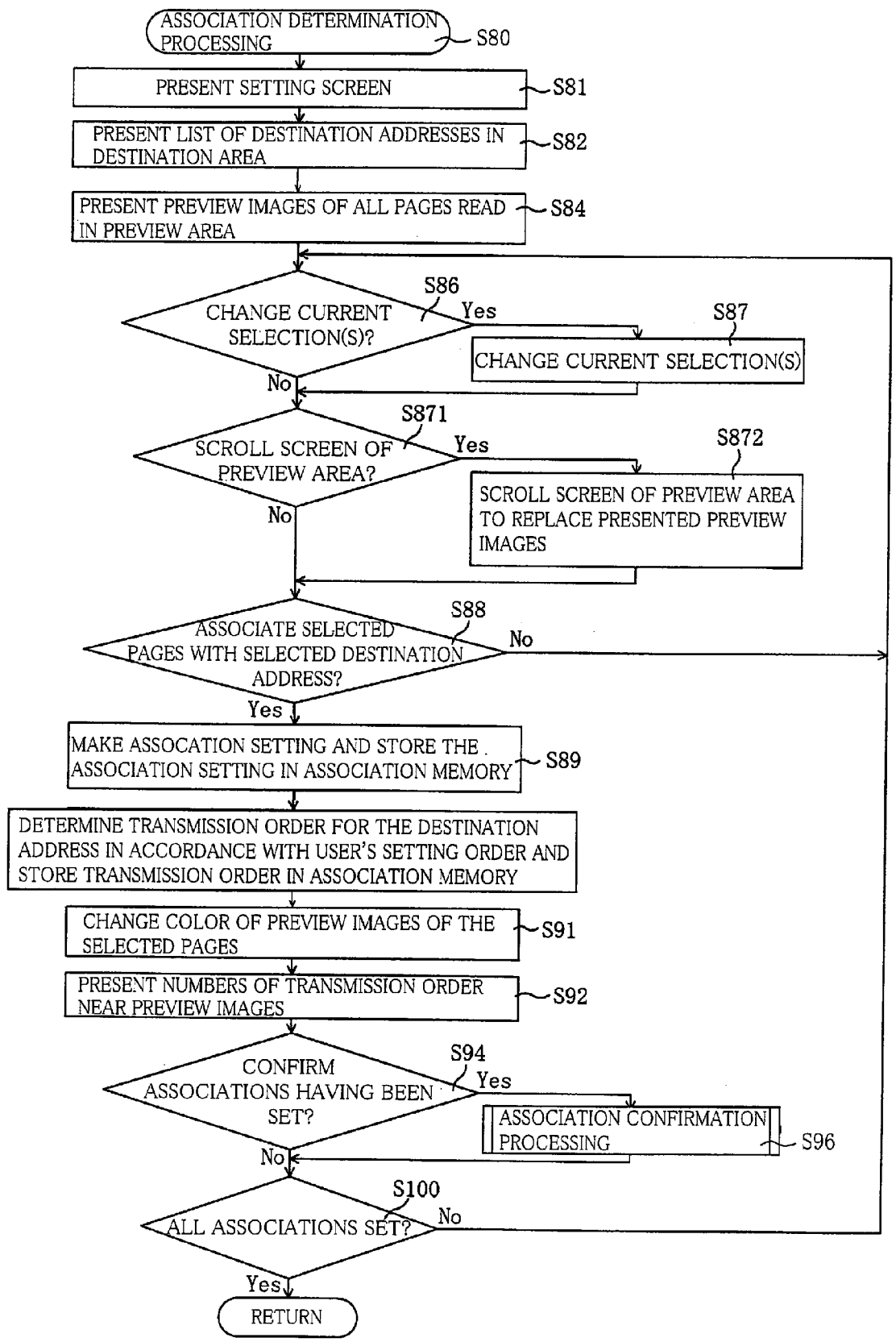
FIG. 10 shows a flowchart according to which an association determination processing is implemented in a multifunction apparatus according to a second embodiment of the invention.

According to the association determination processing in step S80 of the flowchart shown in FIG. 10, preview images of a predetermined number of pages are presented in the preview area 413. Hence, the preview images can be presented such that each preview image is in a size appropriate for the user to easily view. Further, since the user can change the preview images being presented to other preview images by scrolling the screen of the preview area 413, the user can sequentially view a part of all the pages to eventually view all the pages with an easy manipulation, even where the number of pages read by the scanner is relatively large.

Alternatively, the second embodiment may be modified such that the preview images of the respective pages are presented in the preview area 413 one by one.

Figure 11:
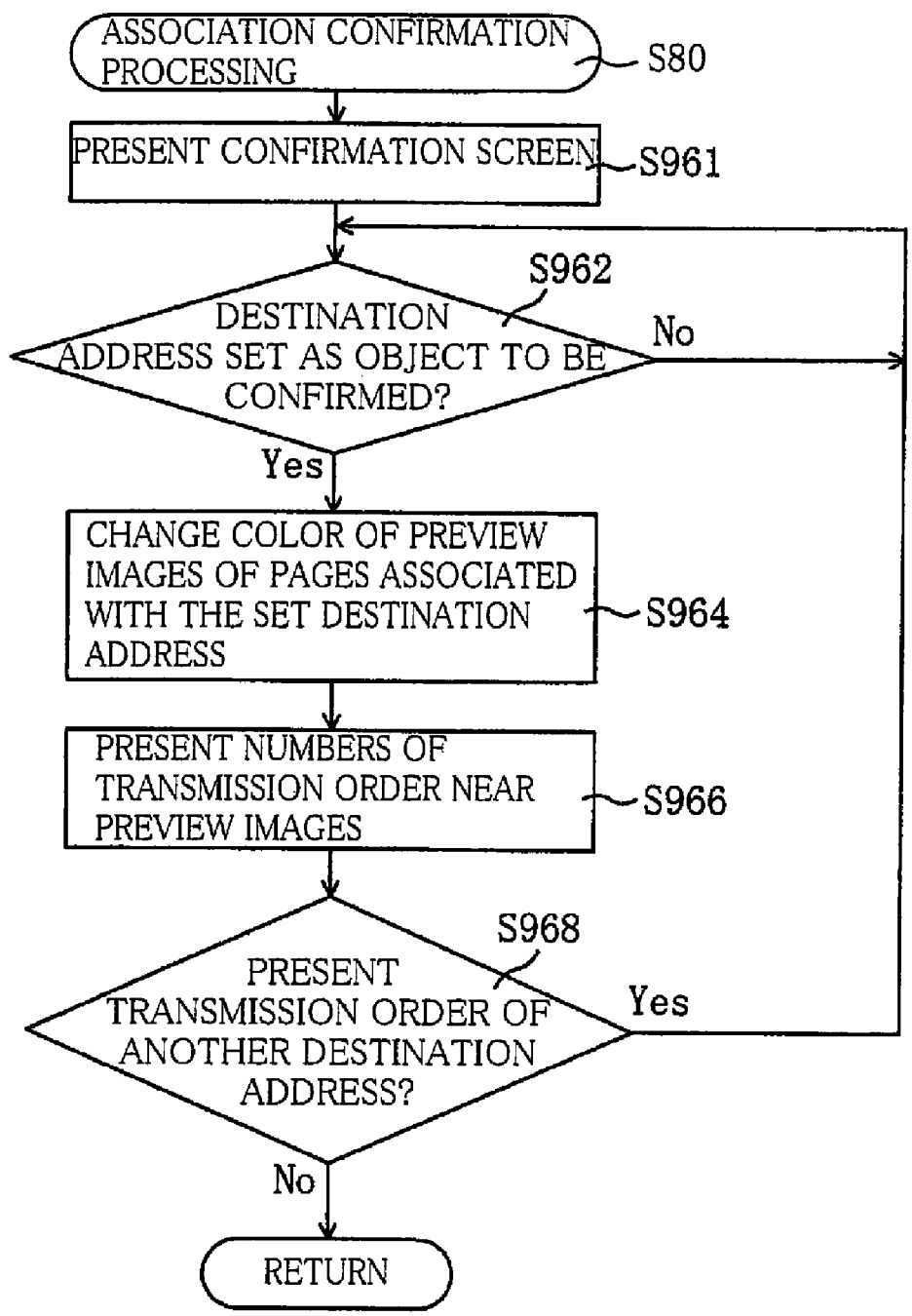
FIG. 11 shows a flowchart according to which an association confirmation processing is implemented in a multifunction apparatus according to a third embodiment of the invention.

Referring to FIG. 11, there will be described a third embodiment of the invention. In the association confirmation processing of step S96 in the flowchart of FIG. 9 according to the first embodiment, the preview images of all the pages associated to a destination address are presented in a same color, and the numbers of the transmission order in which the pages are to be sent are presented near the preview images, and when the user manipulates the manual operation keys 40 in a predetermined manner, the transmission orders of all the destination addresses are presented. However, this arrangement may be modified such that when the user manipulates the manual operation keys 40 in a predetermined manner, only a transmission order of each destination address that is selected by the user is presented.

There will be described a flowchart of FIG. 11 which illustrates the association confirmation processing of step S960 in the third embodiment. The association confirmation processing of step S960 in the third embodiment differs from the association confirmation processing of step S96 in FIG. 9 according to the first embodiment, in that step S970 is not included and that when a negative decision is made in step S968, the processing flow goes back to step S962.

That is, according to the association confirmation processing of step S960, a color of preview images of pages associated with a destination address selected and set by the user as an object to be confirmed is changed in step S964. In the next step S966, numbers of a transmission order are presented near the preview images. In the following step S968, it is determined whether the user selects to present a destination order of another transmission address. When a negative decision (NO) is made in step S968, that is, when the user does not select to present a transmission order of another destination address in step S968, the association confirmation processing of this cycle is terminated.

On the other hand, when the user selects to present a transmission order of another destination address and an affirmative decision (YES) is made in step S968, the processing flow goes back to step S962 in which it is determined whether another destination address is selected and set as the next object to be confirmed. When an affirmative decision (YES) is made in step S962, that is, when the user selects and sets another destination address as the next object to be confirmed, the processing flow goes to step S964 in which a color of preview images of pages associated with the newly set destination address as the next object to be confirmed is changed. In the next step S966, a transmission order of the newly set destination address is presented. A color other than the color used in the presentation of the numbers of the transmission order previously presented is used to the presentation of the numbers of the transmission order of the newly set destination address, in order to enable the user to distinguish between the two transmission orders.

According to the association confirmation processing of the third embodiment, transmission orders are presented with respect to only the destination addresses desired by the user. Hence, even where the number of the intended destination addresses is relatively large, the user can easily see or comprehend the transmission orders upon viewing the confirmation screen.

Although in the first to third embodiments the numbers of a transmission order are presented near the preview images, the embodiments may be modified such that an order of arrangement of the preview images is changed to accord with the transmission order set by the user.

Figure 12:
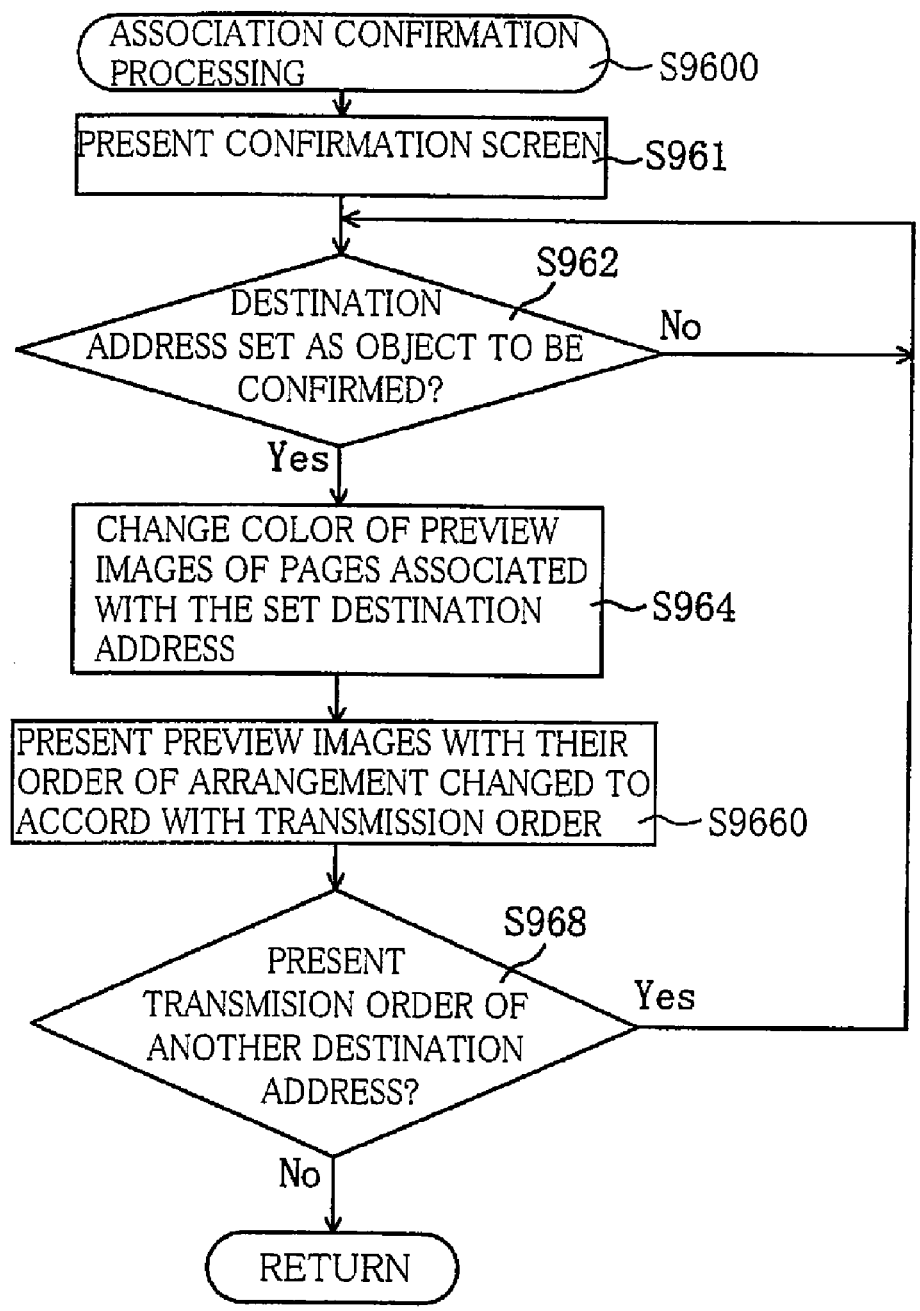
FIG. 12 shows a flowchart according to which an association determination processing is implemented in a multifunction apparatus according to a fourth embodiment of the invention.

Referring to FIG. 12, there will be described a fourth embodiment of the invention, which differs from the third embodiment shown in FIG. 11, only in the association confirmation processing. That is, in step S966 in the association confirmation processing of the third embodiment, the numbers of a transmission order are presented near the preview images. On the other hand, in the corresponding step S9660 in the association confirmation processing S9600 of the fourth embodiment, the order of arrangement of the preview images is changed to accord with the transmission order. As a result of implementation of this reordering or rearrangement in step S9660, the setting screen one example of which is shown in FIG. 5B is replaced with a confirmation screen shown in FIG. 13. Thus, the confirmation of the transmission order by the user is facilitated.

It is noted that along with, or instead of, the reordering or rearrangement of the preview images presented in the confirmation screen as described above, the presentation in the setting screen one example of which is shown in FIG. 5B may be changed to be identical with the presentation in the confirmation screen shown in FIG. 13.

In the above-described embodiments, the invention is applied to a multifunction apparatus capable of a plurality of functions. However, the invention is applicable to any other apparatuses, such as a facsimile apparatus, that have an arrangement for obtaining image data that corresponds to the scanner 3, and an arrangement for sending the image data.

In the above-described embodiments, the invention is applied to a case where image data obtained by the scanner 3 is sent by facsimile. However, the invention is applicable to a case where image data obtained by the scanner 3 is sent to a personal computer connected to an image processing apparatus according to the invention via a connecting means such as a network interface. In the latter case, the image processing apparatus may present a setting screen in which an address of the personal computer that corresponds to a destination address and preview images of the pages are presented side by side.

Although there have been described several embodiments of the invention, it is to be understood that the invention is not limited to the details of the embodiments, but may be otherwise embodied with various modifications and improvements that may occur to those skilled in the art, without departing from the scope and spirit of the invention defined in the appended claims.

What is claimed is:

1. An image processing apparatus comprising:
a reading portion which reads an image to obtain image data of the image;
a transmission-information display portion comprising a display with a single screen which simultaneously presents, in the single screen, a plurality of preview images indicative of contents of the image data obtained by the reading portion, and a plurality of destination addresses;
an association setting portion which sets an association between at least one of the plurality of preview images being presented by the transmission-information display portion and one of the destination addresses being presented by the transmission-information display portion, which one destination address is selected by a user; and
a sending portion which sends the image data, the content of which is indicated by said at least one of the plurality of preview images, to the destination address with which said at least one of the plurality of preview images is associated, on the basis of the association set by the association setting portion,
wherein the image data is constituted by a plurality of image data pieces respectively corresponding to a plurality of pages, and the plurality of preview images are constituted by the plurality of preview images of the respective pages,
wherein the transmission-information display portion is such that the plurality of preview images of the pages are presented in an arrangement in the single screen,
wherein the association setting portion includes a preview-image setting portion which permits the user to select and set the at least one of the plurality of preview images being presented by the transmission-information display portion, the association setting portion setting an association between the at least one of the plurality of preview images selected by the user and the destination address selected by the user,
wherein the transmission-information display portion simultaneously presents both the at least one of the plurality of preview images selected by the user and the preview image not selected by the user in different manners from each other,
wherein the transmission information display portion switches, where the destination address selected by the user is switched between a first destination address and a second destination address, between
(i) a first presenting state in which both the at least one preview image associated with the first destination address and the preview image not associated with the first destination address in different manners from each other are simultaneously presented and
(ii) a second presenting state in which both the at least one preview image associated with the second destination address and the preview image not associated with the second destination address in different manners from each other are presented,
wherein the association setting portion includes an association storing portion which stores both an association between at least one first selected preview image associated with the first destination address and an association between at least one second preview image associated with the second destination address, the first selected preview image being associated with the first destination address set by the association setting portion, the second preview image being associated with the second destination address set by the association setting portion, and wherein the transmission-information display portion switches, where the destination address selected by the user is switched between the first destination address and the second destination address, between (i) the first presenting state presented on the basis of the association between the at least one first preview image and the first destination address stored in the association storing portion and (ii) the second presenting state presented on the basis of the association between the at least one second preview image and the second destination address stored in the association storing portion.

2. The apparatus according to claim 1, wherein the transmission-information display portion presents, in an arrangement in the single screen, the plurality of preview images of a predetermined number of pages among all the pages, the apparatus further comprising a scrolling portion which permits the user to scroll the screen in order to replace the preview images currently presented in the screen with other preview images.

3. The apparatus according to claim 1, wherein the transmission-information display portion presents the destination addresses such that at least one of the destination addresses is presented differently from the other destination addresses.

4. The apparatus according to claim 1, wherein the sending portion sends each of the destination addresses only image data piece of the at least one page associated with the destination address, the apparatus further comprising a transmission-order determining portion which determines, when the at least one associated page is constituted by a plurality of pages, a transmission order which is an order in which the pages are sent by the sending portion to the destination address associated therewith.

5. The apparatus according to claim 4, wherein the transmission-order determining portion determines the transmission order in accordance with an order in which the user sets the pages by means of the preview-image setting portion.

6. The apparatus according to claim 4, wherein the transmission-information display portion includes a preview-image rearranging portion which presents the preview images with an order of arrangement of the preview images changed to accord with the transmission order determined by the transmission-order determining portion.

7. The apparatus according to claim 4, wherein the transmission-information display portion includes a transmission order display portion which presents, near the preview images of the pages, numbers of the transmission order determined by the transmission-order determining portion.

8. The apparatus according to claim 7, wherein the transmission order display portion presents only the transmission order with respect to each of at least one of all the destination addresses presented by the transmission-information display portion, the at least one destination address being selected by the user.

9. The apparatus according to claim 7, wherein the transmission order display portion presents the transmission orders determined by the transmission-order determining portion with respect to the destination addresses such that the numbers of the respective transmission orders are presented in respective manners in order to be distinguishable among the transmission orders.

10. The apparatus according to claim 9, wherein presenting the numbers of the respective transmission orders in respective manners is presenting the numbers of the respective transmission orders in respective colors.

11. The apparatus according to claim 1, further comprising:

a destination-address-information storing portion in which information on the destination addresses is registered; and a set address display portion which simultaneously presents in a single screen the information on the destination addresses registered in the destination-address-information storing portion, and the destination address selected by the user.

12. The image processing apparatus according to claim 1, wherein the at least one different manner comprises a manner which differentiates, by color, the at least one preview image selected by the user from the preview image not selected by the user.

13. The apparatus according to claim 1, wherein the transmission-information display portion switches, where the destination address selected by the user is switched between the first destination address and the second destination address, between (i) a third presenting state in which both the at least one first preview image associated with the first destination address and each of at least one number indicative of a first transmission order presented near corresponding one of the at least one first preview image associated with the first destination address are simultaneously presented and (ii) a fourth presenting state in which both the at least one second preview image associated with the second destination address and each of at least one number indicative of a second transmission order presented near corresponding one of the at least one second preview image associated with the second destination address are simultaneously presented.

14. The apparatus according to claim 1, wherein the transmission-information display portion presents both the at least one of the plurality of preview images selected by the user and the destination address selected by the user in a same manner.

15. An image processing apparatus comprising:

a transmission-information display portion comprising a display with a single screen which simultaneously presents, in single screen, at least one destination address and a plurality of preview images indicative of contents of image data pieces respectively corresponding to a plurality of pages;

an association setting portion which sets at least one association between at least one of the plurality of preview images being presented by the transmission information display portion and at least one of the at least one destination address presented by the transmission information display portion, each set of the at least one preview image and the at least one of the at least one destination address which are to be associated with each other being selected by a user; and a sending portion which sends the image data of the at least one of the plurality of preview images to the at least one destination address with which of the at least one of the plurality of preview images is associated, on the basis of the association which is set by the association setting portion, wherein the image data is constituted by a plurality of image data pieces respectively corresponding to a plurality of pages, and the plurality of preview images are constituted by the plurality of preview images of the respective pages, wherein the transmission-information display portion is such that the plurality of preview images of the pages are presented in an arrangement in the single screen, wherein the association setting portion includes a preview-image setting portion which permits the user to select and set the at least one of the plurality of preview images being presented by the transmission-information display portion, the association setting portion setting an association between the at least one of the plurality of preview images selected by the user and the destination address selected by the user, wherein the transmission-information display portion simultaneously presents both the at least one preview image selected by the user and the preview image not selected by the user in different manners from each other, wherein the transmission information display portion switches, where the destination address selected by the user is switched between a first destination address and a second destination address, between
(i) a first presenting state in which both the at least one preview image associated with the first destination address and the preview image not associated with the first destination address in different manners from each other are simultaneously presented and
(ii) a second presenting state in which both the at least one preview image associated with the second destination address and the preview image not associated with the second destination address in different manners from each other are presented, wherein the association setting portion includes an association storing portion which stores both an association between at least one first selected preview image associated with the first destination address and an association between at least one second preview image associated with the second destination address, the first selected preview image being associated with the first destination address set by the association setting portion, the second preview image being associated with the second destination address set by the association setting portion, and wherein the transmission-information display portion switches, where the destination address selected by the user is switched between the first destination address and the second destination address, between
(i) the first presenting state presented on the basis of the association between the at least one first preview image and the first destination address stored in the association storing portion and
(ii) the second presenting state presented on the basis of the association between the at least one second preview image and the second destination address stored in the association storing portion.

16. The apparatus according to claim 15, further comprising a transmission-order determining portion which determines, when the at least one associated page is constituted by a plurality of pages, a transmission order which is an order in which the pages are sent by the sending portion to the destination address associated therewith.

17. The apparatus according to claim 16, wherein the transmission-information display portion includes a transmission order display portion which presents, near the preview images of the pages, numbers of the transmission order determined by the transmission-order determining portion.

\* \* \* \* \*